(12) United States Patent
Wietzke et al.

(10) Patent No.: US 10,882,618 B2
(45) Date of Patent: Jan. 5, 2021

(54) MULTIFUNCTIONAL CONTAINER SYSTEM FOR PRODUCING A CONTAINER UTILIZABLE IN A CARGO COMPARTMENT OF AN AIRCRAFT

(71) Applicant: AIRBUS OPERATIONS GMBH, Hamburg (DE)

(72) Inventors: Andreas Wietzke, Hamburg (DE); Thomas Lerche, Hamburg (DE); Ralf Schliwa, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 365 days.

(21) Appl. No.: 15/916,514

(22) Filed: Mar. 9, 2018

(65) Prior Publication Data

US 2018/0273180 A1   Sep. 27, 2018

(30) Foreign Application Priority Data

Mar. 24, 2017 (DE) .......................... 10 2017 106 411

(51) Int. Cl.
*B64D 9/00* (2006.01)
*B64D 11/00* (2006.01)
(Continued)

(52) U.S. Cl.
CPC ............ *B64D 11/003* (2013.01); *B64C 1/061* (2013.01); *B64C 1/22* (2013.01); *B64D 9/00* (2013.01);
(Continued)

(58) Field of Classification Search
CPC ... B64C 1/061; B64C 1/22; B64C 2001/0027; B64C 2211/00; B64D 11/003;
(Continued)

(56) References Cited

U.S. PATENT DOCUMENTS 5,784,836 A * 7/1998 Ehrick ................... B64D 11/00
52/79.8
6,152,400 A * 11/2000 Sankrithi ............... B64D 11/00
105/315

(Continued)

FOREIGN PATENT DOCUMENTS

DE              4416506 C2   11/1995

*Primary Examiner* — Claude J Brown
(74) *Attorney, Agent, or Firm* — Greer, Burns & Crain, Ltd.

(57) ABSTRACT

A multifunctional container system for producing a container for a cargo compartment of an aircraft includes a first lateral container component, which forms a first lateral surface of the container that is at least partially beveled, a first lower resting surface having first fastening devices and a first top side, a second lateral container component, which forms a second lateral surface of the container that is at least partially beveled, a second lower resting surface having second fastening devices and a second top side, and a floor cladding. The cladding is selectively positionable between the first resting surface and the second resting surface, which enclose a continuous gap to each other and comprise a predetermined distance to each other and to create a protrusion that faces away from the first and second top side. The protrusion extends into a recess of a floor in a cargo compartment.

20 Claims, 9 Drawing Sheets

(51) Int. Cl.
*B64C 1/06* (2006.01)
*B64C 1/22* (2006.01)
*B64C 1/00* (2006.01)

(52) U.S. Cl.
CPC ...... *B64D 11/00* (2013.01); *B64C 2001/0027* (2013.01); *B64C 2211/00* (2013.01); *B64D 2011/0046* (2013.01); *B64D 2011/0069* (2013.01); *B64D 2011/0076* (2013.01)

(58) Field of Classification Search
CPC .... B64D 2011/0046; B64D 2011/0069; B64D 2011/0076; B64D 9/00
USPC ........................................................ 244/118.5
See application file for complete search history.

(56) References Cited

U.S. PATENT DOCUMENTS

| | | | |
|---|---|---|---|
| 2004/0075025 A1* | 4/2004 | Dees | B64C 1/26 244/119 |
| 2016/0075432 A1 | 3/2016 | Wartena | |
| 2017/0137109 A1* | 5/2017 | Sieben | B64C 1/18 |
| 2019/0225339 A1* | 7/2019 | Blauwhoff | B64D 11/04 |

\* cited by examiner

MULTIFUNCTIONAL CONTAINER SYSTEM FOR PRODUCING A CONTAINER UTILIZABLE IN A CARGO COMPARTMENT OF AN AIRCRAFT

CROSS-REFERENCES TO RELATED APPLICATIONS

This application claims the benefit of, and priority to, German patent application number DE 102017106411.7, filed Mar. 24, 2017. The content of the referenced application is incorporated by reference herein.

TECHNICAL FIELD

Embodiments of the invention relate to a multifunctional container system for producing a container utilizable in a cargo compartment of an aircraft, as well as an aircraft comprising a cargo compartment having a guiding device for introducing and holding containers, as well as at least one container, which is created through a container system.

BACKGROUND OF THE INVENTION

In particular with wide-body aircraft it is known to provide facilities for persons, i.e., passengers and crew members, inter alia in a lower deck. Installation space of a lower deck that is not occupied by installations, whose floor in an aircraft fuselage is closest to the lower shell of the fuselage as possible, is usually almost exclusively used for luggage and cargo. Also, it is known to lower a part of a floor of the lower deck, in order to provide an enlarged standing height at least locally.

Thus, for example, patent document DE 44 16 506 C2 shows an aircraft having a circular fuselage cross section and two decks arranged on top of each other, wherein the lower deck comprises a floor, which is lowered in a region, such that in this region a common standing height of persons is reached. Such a region may be designed in the shape of a stripe and may be used as an aisle. Passenger modules may be arranged and fastened at the sides of the aisle in the cargo compartment.

Patent publication US 2016/0075432 A1 discloses a mobile crew rest compartment for an aircraft having a floor that is lowerable in a region.

BRIEF SUMMARY OF THE INVENTION

It is an object of the disclosed subject matter to achieve an as comfortable and flexible utilization of a lower deck as possible. In particular this is to be understood as the simple handling of passenger modules and the like, the flexibility of the equipment of passenger modules and also an as quick reconfigurability as possible. Furthermore, it is an object to provide a variable installation of passenger and cargo containers to always achieve an optimum utilization of the available cargo compartment volume.

This object is met by a multi functional container system having the features of the independent claim 1. Advantageous further improvements and embodiments are to be gathered from the dependent claims and the following description.

A multifunctional container system is proposed for producing a container utilizable in a cargo compartment of an aircraft. The container system comprises a first lateral container component which comprises a first lateral surface of the container that is at least partially beveled, a first resting surface having first fastening devices and a first top side; a second lateral container component which comprises a second lateral surface of the container that is at least partially beveled, a second resting surface having second fastening devices and a second top side; and a floor cladding. The floor cladding is configured for selectively being positioned between the first resting surface and the second resting surface which enclose a continuous gap to each other and comprise a predetermined distance to each other and to create a protrusion that faces away from the first and second top side, which protrusion extends into a recess of a floor in a cargo compartment, at least in a region.

The utilization of the multifunctional container system allows the provision and utilization of different containers with different equipment in a cargo compartment of an aircraft. A characteristic of the container system according to the disclosure lies in the partition of a container into substantially two main components in form of the first lateral container component and the second lateral container component. Both container components do not necessarily need to be separate components. They may also be interpreted as lateral sections or regions of a container, in whose floor surface a continuous cutout is present, which defines both resting surfaces.

According to the disclosure, the container components together with the floor cladding are completable to full, closed and usable containers, at which the cutout in the floor surface is covered. Thereby, a region of a section of a cargo compartment can be utilized through the floor cladding, which region would otherwise remain unused.

Due to the round and cylindrical shape of an aircraft fuselage, the width of the cross-sectional contour of the fuselage usually decreases in the vertical direction. Cargo compartments, which are often arranged in a lower region of an aircraft fuselage, i.e., in a lower deck, therefore comprise a floor surface, which is narrower than the width in a region opposed to the floor surface. For this reason the use of trapezoidal containers is widespread, which containers have two lateral surfaces which are beveled along their longitudinal direction.

Here, the first lateral container component and the second lateral container component now each comprise one of the both beveled lateral surfaces and thus are designed to coincide with the longitudinal direction of the cargo compartment and the aircraft, respectively. The lateral container components may thus comprise a rather elongate extension.

The fastening devices are arbitrary devices which are able to allow a fixation of the container components in the cargo compartment. Exemplarily form fit elements are possible, which are, inter alia, realized as openings. Here, fastening elements may be introduced or attached which are connected to corresponding receptacles in the cargo compartment.

At least the resting surfaces of both container components are distanced from each other, if both container components are in a use position. In this regard, a use position is to be understood such that both container components are arranged and fixed at their predetermined positions in the cargo compartment and that the floor cladding is arranged between the resting surfaces and creates a lower protrusion. If the container is realized as one piece and if it comprises a cutout in the floor surface for creating the first resting surface and the second resting surface, the use position may be reached by providing the floor cladding. In the use position both container components and the lower protrusion are accessible and connected to each other. Hence, the container is usable.

A continuous gap is arranged between the resting surfaces. Preferably, it comprises the same main extension direction as both container components and the lateral surfaces of the container, respectively. This main extension direction may coincide with the longitudinal axis of the aircraft and the cargo compartment, respectively.

In the use position, the floor cladding constitutes a lower protrusion. The floor cladding may extend into a specifically provided or already present stripe-shaped gap between guide rails and a roller conveyor or the like in the cargo compartment. If such a gap is closed through the floor surface it may be cut and displaced vertically, such that the stripe-shaped gap is created.

An additional installation space is created through the lower protrusion in a vertically downward direction. Due to the stripe-shaped gap it may particularly be limited to a stripe-shaped surface in the longitudinal direction of the container created by the container system. By this, an enlarged standing height may be generated inside the container. The respective container may be walked through easily and particularly without ducking.

The respective cladding may be realized through different measures, which are further specified in the following. Without claiming to be complete, particularly surface-like or surface-shaped structures are possible which are realized in a flexible/elastic or high-tensile manner. As an alternative or additionally thereto, the cladding may also comprise segmented or otherwise divided rigid bodies which may selectively create a protrusion and which may be connected in an articulated manner.

For creating and activating the protrusion, respectively, or for removing and deactivating the protrusion, respectively, mechanisms may be utilized which hold and/or support the cladding in different positions. The mechanisms are integrated at one of the container components, at both container components or directly in the respective cladding or arrangeable thereon.

Altogether, through the container system according to the disclosure, a clear advantage over known multifunctional container systems may be achieved, as additional installation space is creatable without modifications at the actual structure of the aircraft. This additional installation space may particularly be limited to a stripe-shaped section in the longitudinal direction of the container. It lends itself to use the additional installation space for creating an enlarged standing height.

An advantageous embodiment further comprises a ceiling cladding, wherein the ceiling cladding is configured for being positioned between the first top side and the second top side with the first and second lateral container components placed in a predetermined distance. Through the arrangement of the ceiling cladding between both top sides of the container components, a gap that is preferably stripe-shaped there may be covered. The ceiling cladding consequently closes the top side. Furthermore, it is also conceivable that the ceiling cladding is a fixed cladding which permanently supplements both top sides.

In a further embodiment the ceiling cladding is configured for providing an upper protrusion at least in a region, which upper protrusion faces away from the first resting surface and the second lower resting surface. The creation of the upper protrusion, which faces away from a bottom side of the container, may generate an additional room part. For example it may be strived for arranging the ceiling cladding and, consequently, the dividing position between the top sides of the container components in such a manner that they correlate with a free space between two laterally distanced floor supports arranged above the cargo compartment. Consequently, after introducing a container created by the container system according to the disclosure, the unused region between two floor supports arranged above it may be utilized to generate additional space within the container. For this, no modifications at the structure of the aircraft are required. However, the spatial feeling within the container is significantly improved.

When using container components which are actually completely arranged in a distance to each other, a gap is created, which, in particular, is to be bridged by a floor cladding. The introduction of both container components without distance to each other would in fact be possible through tensioning both container components with each other without further ado. However, the subsequent distancing of the container components within the cargo compartment may lead to a canting. It is therefore suggested to handle a container created by the multifunctional container system the same way as other containers, in particular in regard to the outer contour and the moving into a cargo compartment or out of a cargo compartment. In an advantageous embodiment, the container system further comprises at least one removable spacer which is configured for holding the first lateral container component and the second lateral container component in the predetermined distance, at least in a region, for an insertion into or removal out of a cargo compartment. In particular, the spacer may be arranged at the opening edges of both container components that face each other. The spacers should be able to absorb and transfer the usual stresses and forces that occur in a closed wall of a container. It is suggested to utilize elongate, rod-shaped spacers. However, alternative variants are in no way ruled out and may also include angular spacers besides surface-like spacers. The spacers, if multiple thereof are utilized, may be distributed over opening contours of both container components in regular or irregular distances. When dimensioning and designing these spacers it should be considered that they are selectively and easily removable with the container being arranged in the cargo compartment.

In an advantageous embodiment the ceiling cladding is at least partially made from a surface-like textile fabric, which is coupled with a strut mechanism in such a manner that the upper protrusion is selectively creatable. The strut mechanism may be arranged at end faces and additionally or alternatively also at intermediate positions. For example, the strut mechanism may be linked through a lever arrangement and may move the textile fabric into an extended or retracted position in the way as, or similar to, an umbrella mechanism.

The ceiling cladding may be arranged at the first or the second container component so as to be stowable and selectively connectable with the respective other container component. In particular, with a more delicate material for the ceiling cladding, it is suggested to stow it during handling of the container on ground and to distance the container components through spacers. After moving the container to the intended position in the cargo compartment, the ceiling cladding may subsequently be moved from a stowage position into a use position.

The lower protrusion may comprise a cross-section that is substantially rectangular or trapezoidal in the longitudinal direction of the container. By this it would be possible to create a usable surface for accommodating an aisle or the like. With usual cargo loading systems of commercial aircraft a resting surface of approximately 15 inches would be possible. It is determined by a distance of longitudinal struts, on which the cargo loading system is arranged. Such a design leads to a comfortable lower protrusion and allows a simple passage through a container.

The floor cladding may comprise multiple plate-shaped elements, which are at least partially articulatedly connected to at least one of the first container component and the second container component. This design is mechanically very simple and additionally, the integration of a circumferential sealing surface allows a preventing of the passage particularly of extinguishing gases between the cargo compartment and the inner space of a container created by the container system.

An elongate plate-shaped element may be arranged at each of the first container component and the second container component, which plate-shaped element can be brought into a horizontal neutral position, in which the elongate plate-shaped element is arranged parallel to the respective resting surface, and into a use position, in which the elongate plate-shaped element is foldable downwardly into a position facing away from the respective top side.

In a neutral position, the edges of both elongate plate-shaped elements may be flush, and do not protrude the resting surface downwardly, laterally or longitudinally respectively, such that these may then provide a flush resting surface of the container. This is particularly advantageous for handling the container on the ground, as the resting surface behaves such as at common containers having a fixed and continuous resting surface. After moving the container into the cargo compartment, both plate-shaped elements may be swiveled downwardly, such that they constitute at least a part of the lower protrusion. Both plate-shaped elements consequently constitute a kind of a trap door.

Preferably, the elongate plate-shaped elements of the first container component and the second container component are lockable in a neutral position. Thereby substantially no further measures are required to provide a closed resting surface for the handling of the container. It is suggested to arrange the locking elements, which are required for locking both plate-shaped elements, at the inner side of the container. By this, an accidental release of the locking is prevented, and after introducing the container into the cargo compartment, the locking may be released from within the container very easily. For example, simple lock bar constructions are conceivable, which are distributed in single or multiple form along the length of the respective container.

As mentioned above, the floor cladding provides a substantially closed resting surface in a neutral position with the container components arranged at a distance to each other.

In an advantageous embodiment the container system comprises at least one first connector for connecting the container with at least one supply line, wherein the respective supplies are selected from a group of supplies, the group comprising air, water, electricity and data or signal sources and sinks. When using a container for the stay of persons, a plurality of provisions is to be fulfilled. On the one hand, for providing a comfortable environment, particularly a sufficient amount of light and fresh air should be available, such that a container is always to be connected with an electric supply line and an air duct. For announcements, for personal entertainment, for surveillance and other tasks it is desirable to provide signal or data lines, through which it may communicate with other installations within the aircraft.

In addition, it may be desirable to not only provide a single container through the container system according to the disclosure, but a plurality thereof. In order to operate multiple containers of this kind within the cargo compartment, of course all containers are to be connected with the respective supply lines. For reducing the resulting effort as much as possible, a so-called daisy chain may be realized. For this it is advantageous if the container system comprises at least one second connector for connecting a container with a first connector of a further container, wherein the first connector and the second connector of a container are connected to each other. Due to the limited installation space in the lateral and vertical direction it may be suggested to arrange these connectors, in particular, on face sides. The connectors may preferably latch or snap in place upon mechanical contact, such that providing a connection is particularly simple.

Furthermore, a container in a use position in a cargo compartment may preferably comprise an outer contour, which is equal to the outer contour of an underfloor container. The handling, i.e., the transport of a container provided through the container system according to the disclosure, does not differ from the handling of a common container. Consequently, modifications of related procedures do not have to be made.

The container system may furthermore comprise at least one elongate or circumferential and preferably gas tight seal for sealing the inner space of a container, which is created through the container system, from the cargo compartment. The seal or barrier to a cargo compartment floor is of particular importance, such that, in particular, gaseous extinguishing agents for firefighting do not reach into the container. At the face sides circumferential seals may be reasonable, which lay between two containers arranged one behind the other or merely run around a door or opening region. The floor cladding may further also comprise a flexible, sealing covering.

The disclosure further relates to an aircraft comprising a cargo compartment having a guide element for introducing and holding containers as well as at least one container that is created through a container system according to the above-mentioned features.

The guide element may comprise a distance that is created transverse to a longitudinal direction of the cargo compartment, in which the lower protrusion of the at least one container is placeable. The cargo compartment may comprise an upper delimitation, to which the upper protrusion extends.

In this regard it is further worth mentioning that an emergency exit function from such a container into a cabin arranged above it is reasonable. For this purpose at least one emergency exit opening should be present in the upper cladding, which may be correlatable with an emergency exit hatch of the cabin arranged above it. It is suggested to place the respective emergency exit opening at a position, which is as far away as possible from an entry staircase to the cargo compartment of a container used for the entry. Thereby a particularly advantageous evacuation can be ensured. The emergency exit opening may extend between two distanced floor supports of a cabin arranged above the cargo compartment.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages and application options of the present disclosure are disclosed in the following description of the exemplary embodiments in the figures. All the described and/or illustrated characteristics per se and in any combination form the subject of the disclosure, even irrespective of their composition in the individual claims or their interrelationships. Furthermore, identical or similar components in the figures have the same reference characters.

DETAILED DESCRIPTION OF THE PREFERRED EMBODIMENTS

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
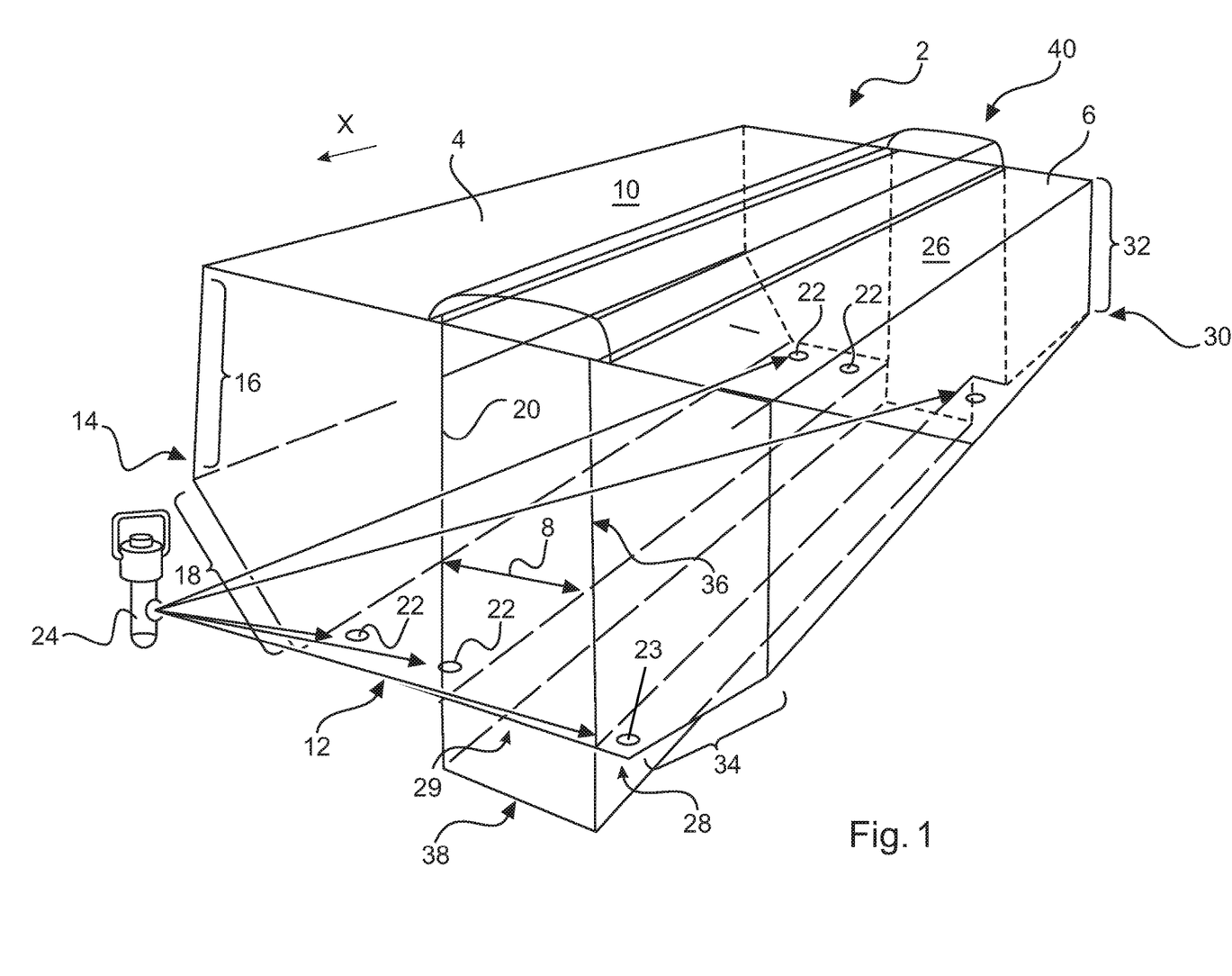
FIG. 1 shows a container system in a three-dimensional, schematic illustration.

FIG. 1 shows a container system for producing a container in a three-dimensional illustration. Here, a container is assembled from a first lateral container component 4 and a second lateral container component 6 which are placed in a distance 8 to each other. According to the above description it shall be understood that both container components 4 and 6 are regions or sections of a container that is otherwise made in one piece, and merely at a floor surface a continuous gap is arranged.

The first lateral container component 4 comprises a first top side 10, as well as a first resting surface 12, which substantially run parallel to each other. A first lateral surface 14 extends between the first top side 10 and the first resting surface 12 on a side of the first container component 4 that faces away from the second container component 6. The first lateral surface 14 comprises an upper, vertical section 16 and a lower, beveled region 18. The beveled region 18 is provided for adapting the container to a cross sectional shape of the aircraft. Consequently, the illustrated case is particularly related to cargo compartments which are provided in a lower region of an aircraft fuselage. Of course, an inverted shape would be possible for cargo compartments which are arranged in an upper region of an aircraft fuselage.

The first container component 4 comprises an opening contour 20 which faces away from the first lateral surface 14. Meanwhile, the first resting surface 12 comprises multiple fastening devices 22 which allow a fixation of the first container component 4 at a floor in the cargo compartment. Merely as an example, fastening elements 24 are illustrated which may be inserted through fastening devices 22, e.g., through-holes, into corresponding fastening devices of a cargo compartment and may be locked there. By this, substantial forces in Z- and Y-direction can be absorbed (vertical and lateral).

The second container component 6 comprises a second top side 26 and a second resting surface 28 which are also arranged substantially parallel to each other and which correspond with the first top side 10 and the second resting surface 12. A continuous gap 29 is created between the resting surfaces 12 and 28. In this example, it extends along a longitudinal axis x.

Multiple second fastening devices 23 are integrated into the second resting surface 28. The second container component 6 comprises a second lateral surface 30 which is designed so as to correspond with the first lateral surface 14. Thus, an upper section 32 is present which is substantially vertical. A beveled section 34 under it is realized in a way similar to the first lateral surface 14 and correlates with a lateral wall of the cargo compartment (not shown).

Like the first container component 4, the second container component 6 comprises an opening contour 36 which faces away from the second lateral surface 30. Both container components 4 and 6 are arranged to be flush, such that they created an outer contour which is equal to the contour of a common underfloor container. The container may be equivalent to an LD6 or LD8 container.

A special characteristic of the container system 2 according to the disclosure lies in a floor cladding 38 which extends between the first resting surface 12 and the second resting surface 28. The floor cladding 38 is configured to selectively create a protrusion in a downward direction, i.e., facing away from the top sides 10 and 26. Exemplarily, the measures of the floor cladding 38 may result from the presence of distanced struts in a cargo compartment for holding a cargo compartment. The distance therebetween may be utilized by the floor cladding 38. The cargo loading system may comprise guide devices which may guide containers within the cargo compartment, for example between a preferred placement position and a cargo loading opening.

Also exemplarily, a ceiling cladding 40 is provided which extends between the first top side 10 and the second top side 26 and which may selectively provide a protrusion upwardly, i.e., at a distance from the resting surfaces 12 and 28. However, this is merely an example and both top sides 10 and 26 may be realized in such a manner that the cladding is fixedly connected to both container components and that merely a floor cladding 38 capable of providing a lower protrusion is used. By means of the floor cladding 38, at least locally a clear increase in the ceiling height is achieved in the container to be created. Thus, the floor cladding 38 is very well utilizable as an aisle, e.g., for reaching a neighboring container or an ascension staircase region. Depending on the design of the cargo compartment of the respective aircraft, widths between roughly 15 and 20 inches may be reached. For managing a height differential between the level within the container components 4 and 6 and the lowered floor in the floor cladding 38, which may sum up to 30 cm (about 12 inches) or more, it may possibly be advantageous to provide step treads in the floor cladding 38.

By way of the additional use of a ceiling cladding 40, the ceiling height may be further increased. The space between the top sides 10 and 26 and a ceiling surface of the cargo compartment may then be substantially occupied by the ceiling cladding 40. Altogether in the region between the ceiling cladding 40 and the floor cladding 38, a standing height of approximately 195 cm (about 78 inches) may be achieved.

It may be reasonable to provide local extensions in a vertical direction, exemplarily in order to have additional space for emergency exits or to provide a non-intrusive installation of equipment (lamps, projectors or similar), which is flush with the adjacent areas in use. These local extensions may exemplarily extend into a region which results from a space between two floor supports of a compartment above the cargo compartment.

Figure 2A:
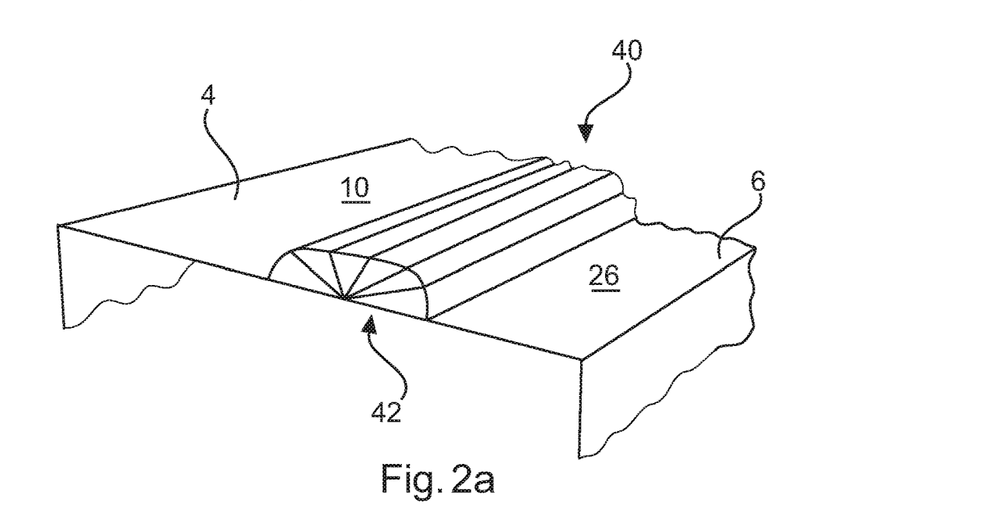
FIGS. 2a to 2c show details of an upper cladding in multiple schematic detail illustrations.

The ceiling cladding 40 may be manufactured from a textile material. FIG. 2a merely schematically shows a kind of strut mechanism 42, with which the ceiling cladding 40 may be brought into the use position shown. The material of the ceiling cladding 40 may be realized in an elastic or high-tensile manner, such that when the strut mechanism 42 is spread out a tensile force is exerted onto the ceiling cladding 40, such that it is stretched taut in the use position. This may exemplarily be realized like the mechanism of an umbrella.

As an alternative or additionally thereto, the container components 4 and 6 may each comprise a stowage device 44, into which the ceiling cladding 40 is retractable like a jalousie. Merely as an example in FIG. 2b it is shown that the first container component 4 comprises such a stowage device. Exemplarily, the stowage device may be realized as an elongate, block-shaped body or container and may comprise a spring mechanism, a motor drive or the such to receive the ceiling cladding 40 or to release/unwind it.

Figure 2B:
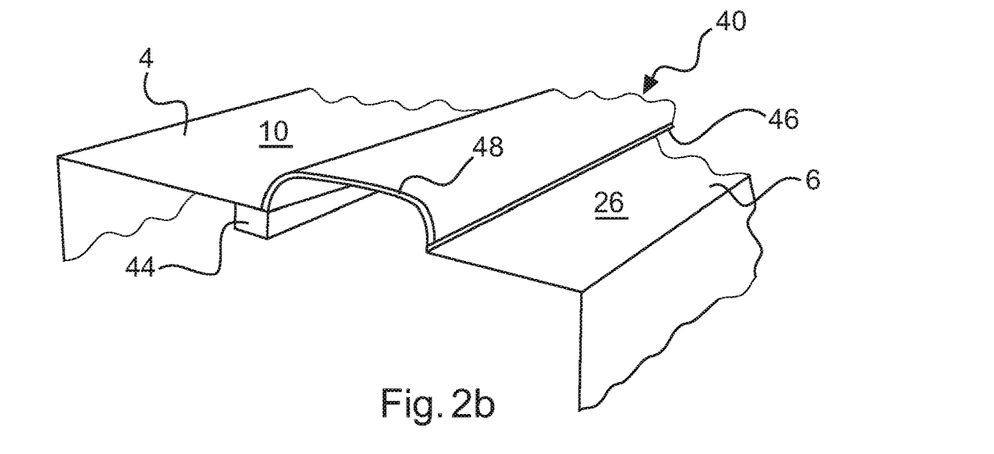

The ceiling cladding may then exemplarily comprise a locking device 46, which is selectively engageable with the second top side 26 or releasable therefrom. For reaching the protruding shape a frame 48 may be clipped on at a face side or may be swiveled up from a neutral position. Rails may be arranged thereon, in which the ceiling cladding 40 is guided. A respective assembly of a frame 48 may be placed on the other face side of the container, such that altogether a tensioning of the ceiling cladding 40 is conducted.

Figure 2C:
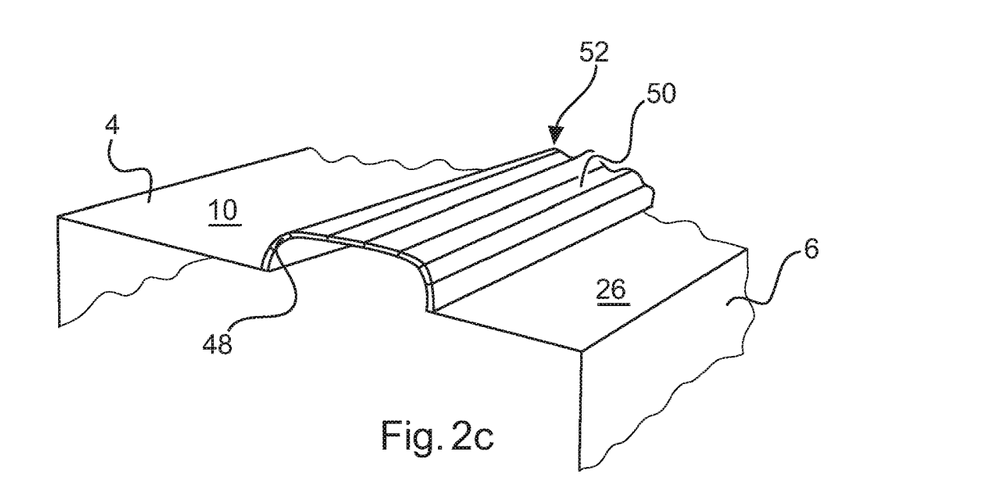

These two examples are not to be considered as a limitation, but also a plurality of other mechanisms, guides and the such for a fixation of a textile fabric for selectively producing a protrusion is conceivable. FIG. 2c shows an embodiment of a ceiling cladding 52 in the form of a segmented, plate-shaped construction, in which the individual segments 50 are connected to each other and are swivable. Hence, the ceiling cladding is realized in the form of a roller blind, for which respective frames 48 are suitable.

Figure 3A:
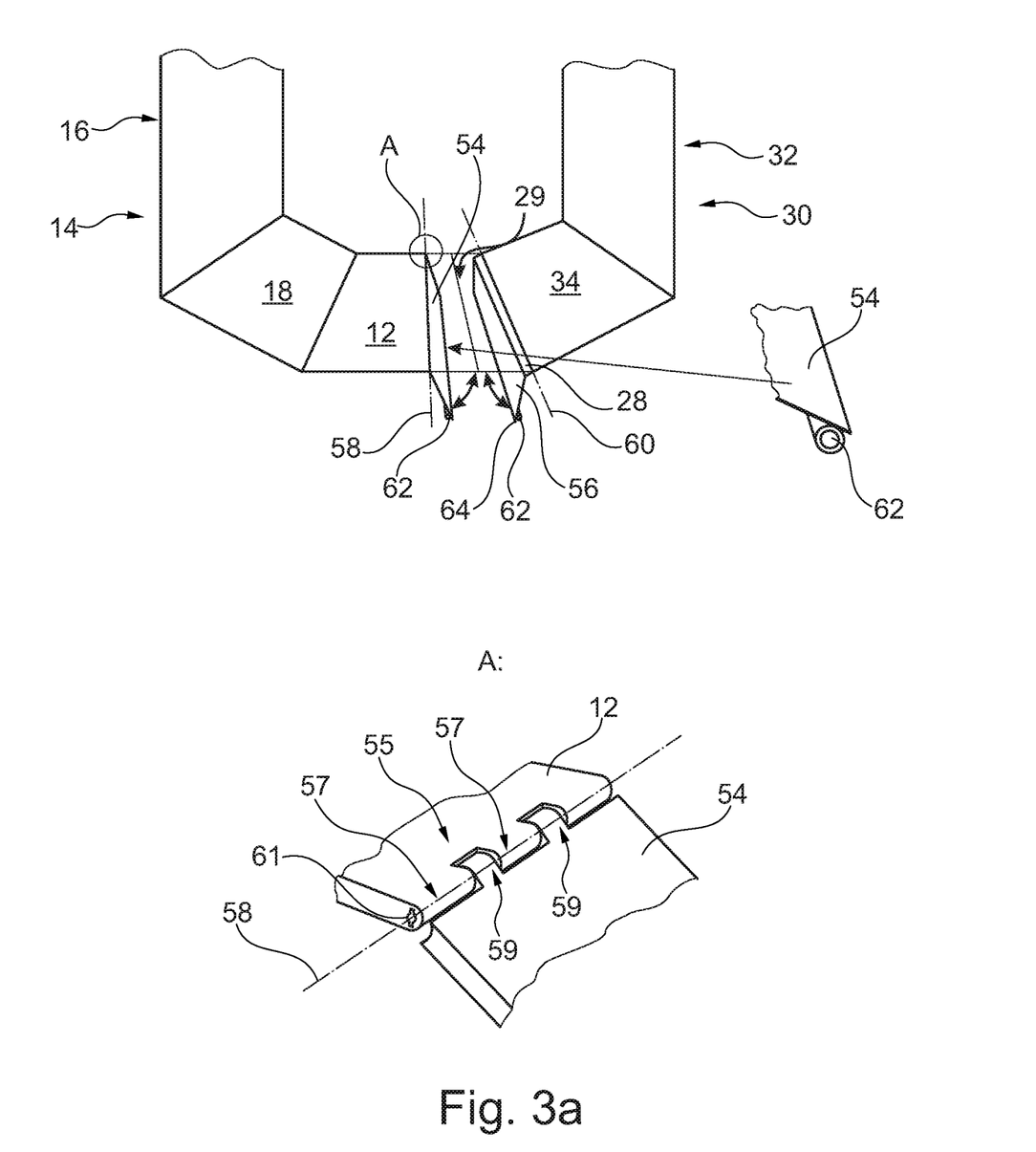
FIGS. 3a to 3e show exemplary embodiments of a lower cladding as well as of locking devices.

FIG. 3a shows a possible detail of a floor cladding 38. Here, two elongate flap-shaped elements 54 and 56 are shown, which in each case are swivably arranged at the respective resting surface 12 and 28 through a swiveling axis 58 and 60. The swiveling axes 58 and 60 run in the longitudinal direction, i.e., along the beveled surface regions 18 and 34, respectively. Both elongate, plate-shaped elements are adapted in their measures in such a way that they create a closed resting surface when swiveled into a horizontal orientation. Hereby, the continuous gap 29 is then covered. At the same time, a respective recess in the cargo compartment (not shown) is contacted in a flush manner through swiveling into a vertical, downwardly oriented position.

Sealing elements 62 and 64 are shown merely schematically, which are adapted to provide an extinguishing agent proof seal, in particular with walls of the recess in the cargo compartment. The sealing element 62 is shown in a schematic detailed sectional view. The sealing element 62 may, in particular, be realized in a shape elastic manner, such that it is compressed when pressed onto a corresponding surface (not shown) in a cargo compartment and resultantly provides a particularly reliable sealing. Exemplarily, the sealing element may be made from a rubber-like plastic material and may comprise a hollow profile. If a fire in the cargo compartment is to be extinguished or to be suppressed, a gaseous fire extinguishing agent may be introduced into the cargo compartment. Hence, for protecting the persons in the container, a passage of extinguishing agent into the container should be prevented.

An exemplary detail of a hinge 55 is shown in a detail in FIG. 3a, which hinge 55 is positioned between the first resting surface 12 and the related flap-shaped element 54. Merely as an example surface sections 57 and 59 are shown, which are alternatingly associated with the first resting surface 12 or the flap-shaped element 5 and in each case alternatingly extend over the hinge axis 58. The surface sections 57 and 59 are penetrated by an axle element 61, such that they interlock in a swivable manner. The hinge 55 may consequently be realized like a piano hinge. The surface sections 57 and 59 may be realized integrally with the respective, superordinate element, i.e., the first resting surface 12 and the flap-shaped element 54. As an alternative thereto, e.g., depending on the material, the surface sections 57 and 59 and the hinge 55, respectively, may be realized as separate component.

Figure 3B:
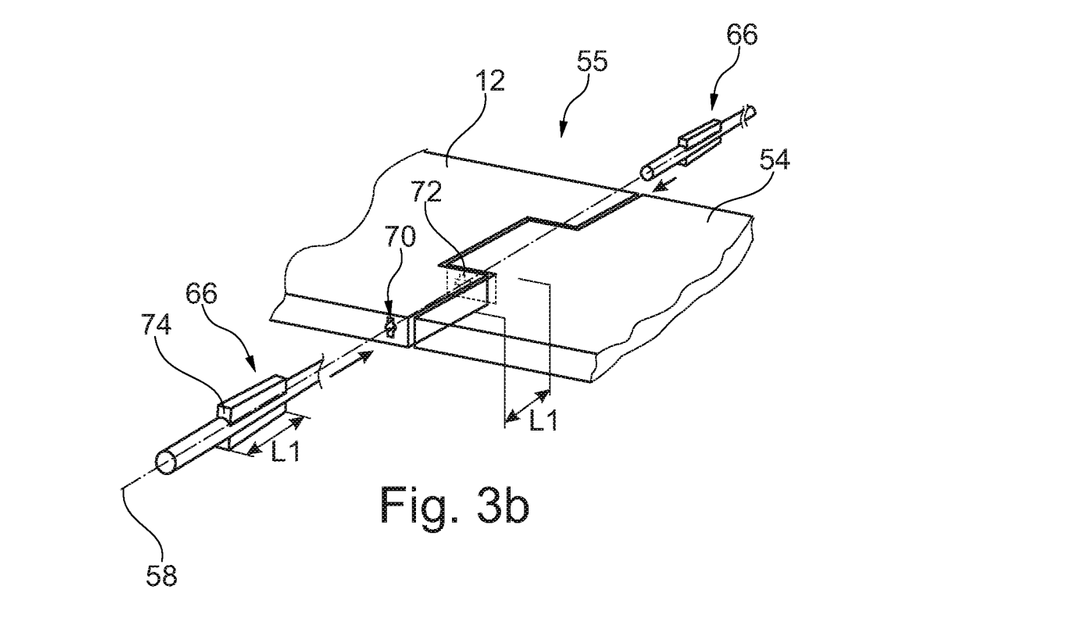
Figure 3C:
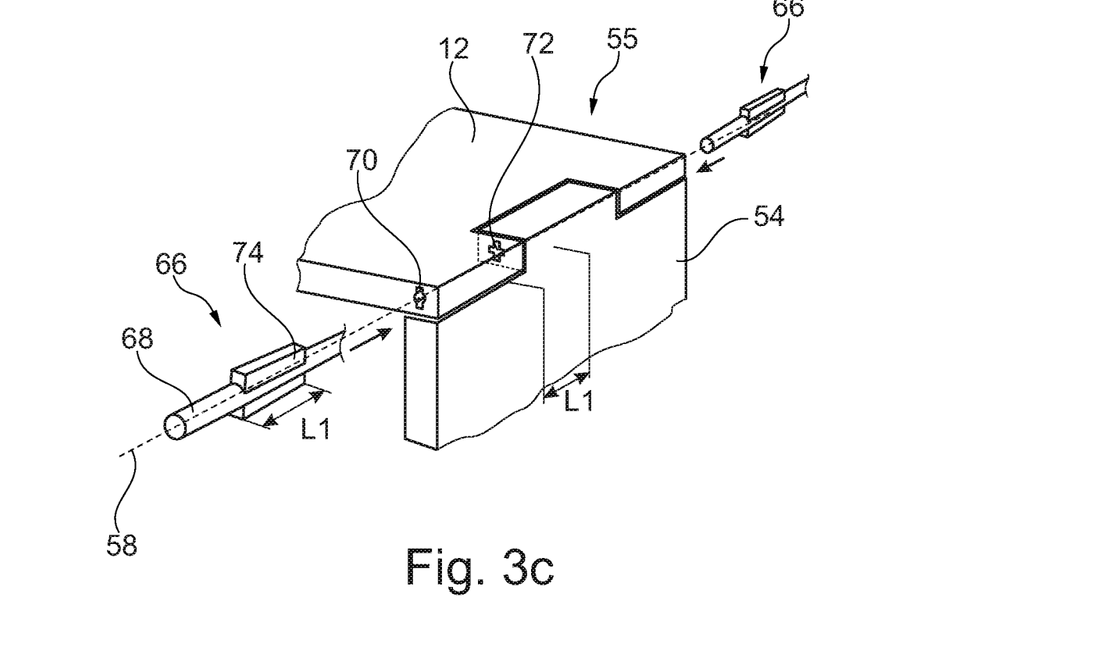

It may be desirable to exert an external torque onto the flap-shaped elements 54 and 56, such that these are swivable or lockable from the outside. FIGS. 3b and 3c show how the hinge 55 of FIG. 3a may be realized for this. The surface sections 57 and 59 may also in each case comprise a through-hole 70 and 72 along the respective hinge axis 58, which is equipped with a profile that allows the introduction of a torque. An axle element 66 is designed so as to correspond thereto.

Exemplarily, FIGS. 3b and 3c show an opening profile of the through-hole 70 of the resting surface 12, which is created from a superposition of a circle and a rectangle having a relatively high aspect ratio, wherein the circle and the rectangular are arranged concentrical to each other. Of course, other variants are possible. The flap-shaped element 54 comprises an opening profile which includes two respective rectangles rotated to each other about 90° around the hinge swiveling axis 58, such that the shape of a plus sign may result.

Consequently, the axle elements 66 include a rod-shaped component 68 which is supplemented with a block extension 74 at least in a region. The axle element 66 may be inserted into the through-hole 70 of the resting surface 12 and may only be inserted into the through-hole 72 of the flap-shaped element 54 in discrete positions. Exemplarily, in FIG. 3b a neutral position is shown, in which the flap-shaped element 54 is arranged in a horizontal position. In this position with the illustrated embodiment of the through-holes 70 and 72, the axle element 66 may be inserted into the through-hole 72, since a part of the contour of the through-hole 70 is flush with the contour of the through-hole 72.

By inserting the box extension 74 into the through-hole 72, the axle element 66 follows the rotation of the through-hole 72 and, resultantly, the swivel position of the flap-shaped element 54. At the same time, the flap-shaped element 54 may only be moved if the axle element 66 unblocks this motion. Consequently, a swiveling or arresting of the flap-shaped element 54 may be achieved through the axle element 66.

In this regard it is worth mentioning that a longitudinal extension L1 of the box extension 74 substantially equals the elongate extension of the through-hole of the flap-shaped element 54.

In FIG. 3c the flap-shaped element is shown in the swiveled-down use position, which is about approximately 90° from the neutral position. Of course, the shape and orientation of the profile of the through-hole 72 of the plate-shaped element 54 may also be adapted to the actual orientation of the flap-shaped element 54 in the use position.

Figure 3D:
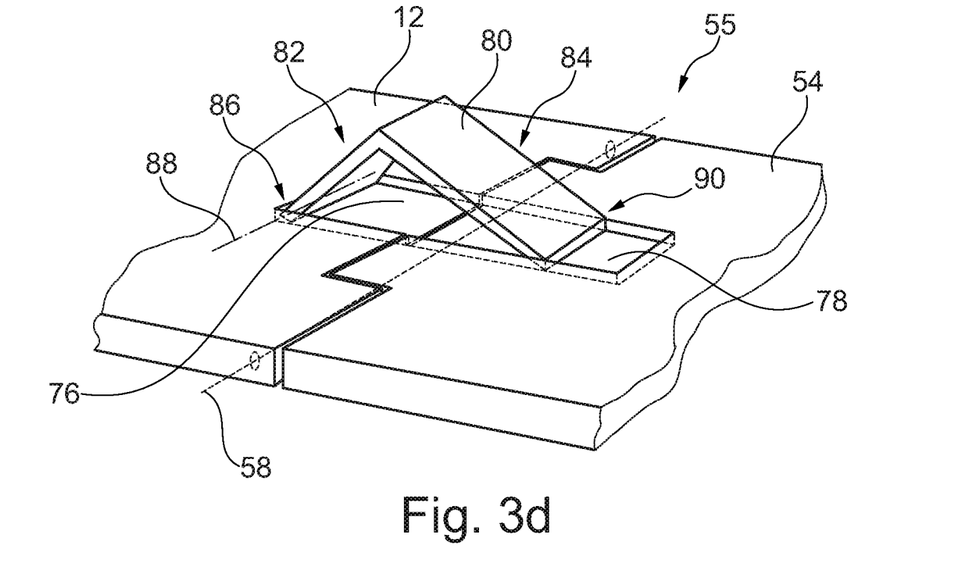
Figure 3E:
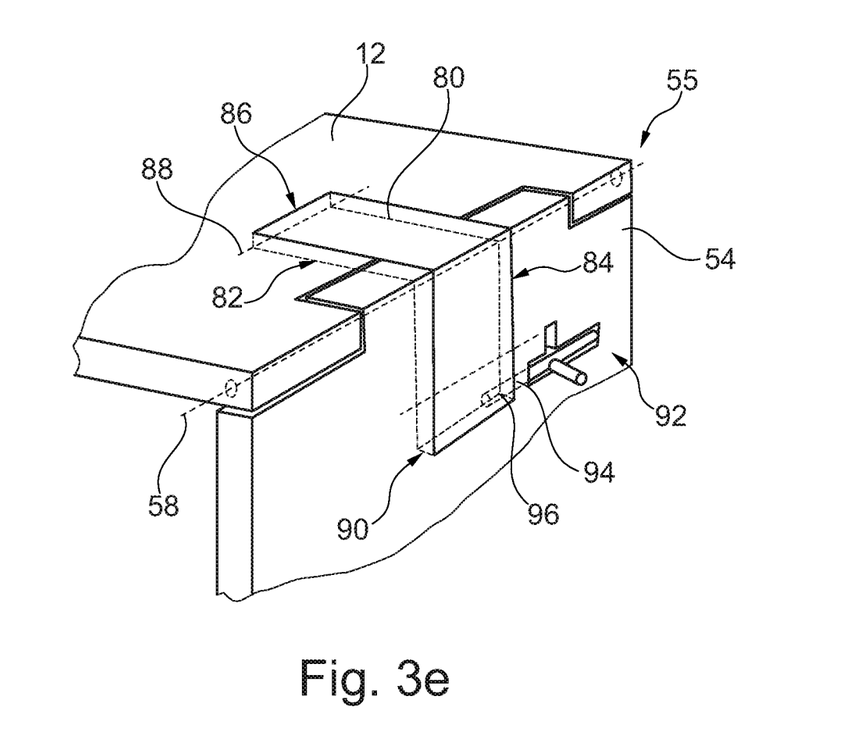

FIGS. 3d and 3e show an effective locking mechanism, which does not require specially designed contours of through-holes. For this, the respective resting surface 12 and the flap-shaped element 54 in each case comprise a surface-like recess 76 and 78, which connect to each other. The recesses 76 and 78 may exemplarily have a rectangular shape and extend over a part of the material thickness of the resting surface 12 and the flap-shaped element 54 in the depth direction.

Additionally thereto, an angle element 80 is provided, which comprises two legs 82 and 84, which enclose an angle that is equal to the angle which is enclosed by the resting surface 12 and the flap-shaped element 54 in a use position. In FIG. 3d the neutral position can be seen, in which the flap-shaped element 54 a constitutes a flush, horizontal resting surface together with the resting surface 12. In this situation, the angle element 80 stands on the resting surface 12 and the flap-shaped element 54 merely with both ends.

After swiveling down the flap-shaped element 54, it assumes an angle with the resting surface 12 in the use position, which equals the angle of the angle element 80. Consequently, the angle element 80 may flushly lay into the recesses 76 and 78. If the angle element 80 has a material thickness which is equal to the depth of the recesses 76 and 78, the angle element flushly supplements the resting surface 12 and the flap-shaped element 54.

It may be provided to support the angle element 80 at a first end 86 so as to be swivable around a swiveling axis 88 which substantially runs parallel to the swiveling axis 58 of the flap-shaped element 54. A locking device 92 may be arranged at the flap-shaped element 54 which locking device 92 comprises a lock bar 94 which is selectively introducible into an opening 96 of the second end 90 of the angle element 80. Thus, the angle element 80 may be reliably locked in the working position, such that the flap-shaped element 54 cannot be moved any more, until the lock bar 94 is released from the opening 96 of the angle element 80 again.

Figure 4:
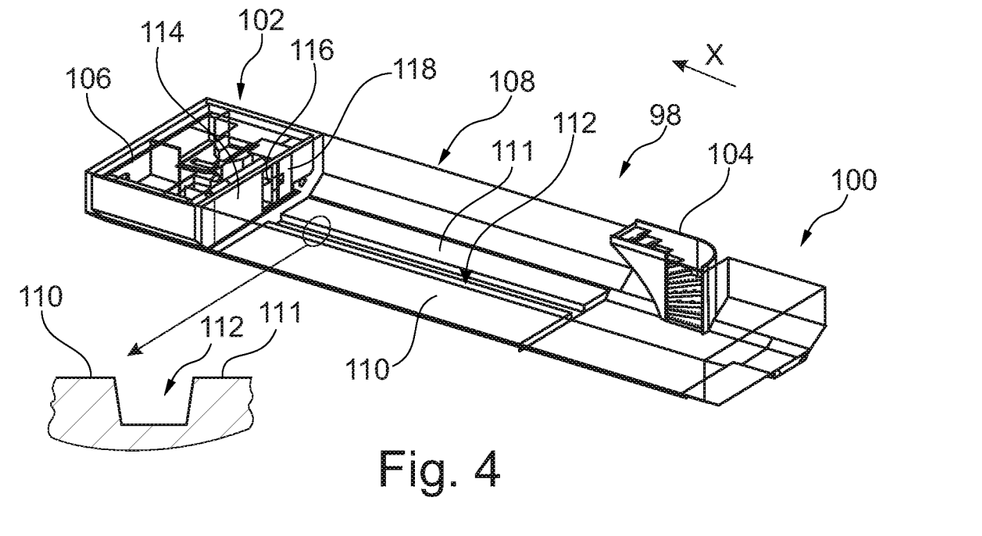
FIG. 4 shows a lower deck having a cargo compartment with a staircase and a stripe-shaped recess without container.

FIG. 4 shows a lower deck 98 of an aircraft with an exemplary equipment, the lower deck 98 having a first end 100 and a second end 102. At the first end 100 a staircase 104 is arranged, through which a person may move between the lower deck 98 and a deck above it (not shown). For this example, the first end 100 is a rear end, such that the flight direction and the longitudinal axis x, respectively, runs from the first end 100 to the second end 102.

A compartment 106, which may exemplarily be a crew rest compartment, is arranged at the second end 102. A cargo compartment 108 is arranged between the staircase 104 and the compartment 106, wherein the cargo compartment 108 comprises two floor surfaces 110 and 111, between which a recess 112 is placed that extends along the longitudinal direction x. The recess 112 may comprise a substantially rectangular or trapezoidal cross-section, as apparent from a partial section.

A wall 114 is arranged at a forward end of the compartment 106 which is equipped with an access opening 116 that is exemplarily closable through a sliding door 118.

Figure 5:
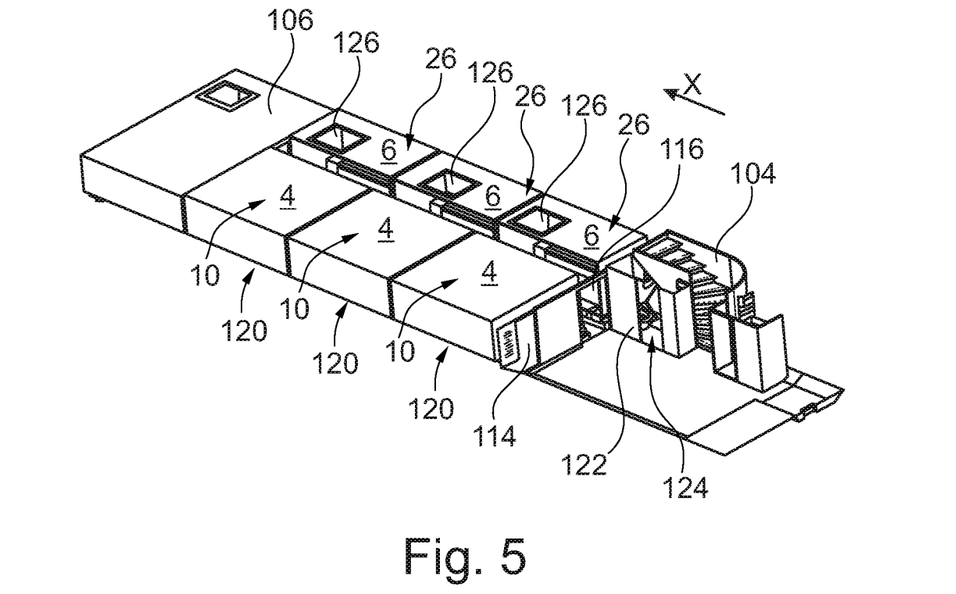
FIG. 5 shows the lower deck of FIG. 4 with three containers arranged one behind the other, which are created through the container system according to the disclosure.

As shown in FIG. 5, a plurality of containers 120 are strung together between the compartment 106 and the staircase 104, which containers are created by the container system 2 according to the disclosure. In this example, first container components 4 stand on the floor surface 110 due to their larger resting surface, while second container components 6 are placed on the somewhat smaller floor surface 111. For simplification purposes, no fastening devices or arresting devices, through which the container components 4 and 6 are connectable with the floor surfaces 110 and 111, are shown in the figures.

The forward wall 114 may then connect to the forward-most of the containers 120 and consequently provides an access to the containers 120 and the compartment 106. Furthermore, a lavatory 122 may be arranged between the access opening 116 and the staircase 104 which houses a toilet 124. This is shown in FIG. 6 in a somewhat enlarged illustration again.

Figure 6:
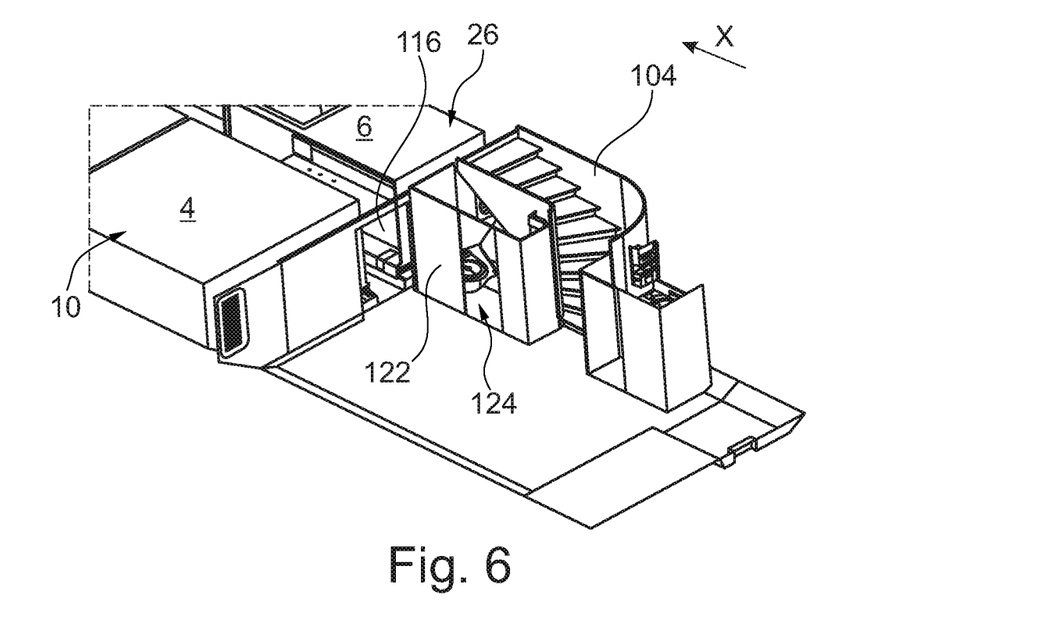
FIG. 6 shows a descent region and an entry to the containers in the lower deck of FIG. 5.

The illustrations of FIGS. 5 and 6 are simplified to a certain extent and do not show a ceiling cladding. Due to this reason the first top sides 10 and the second top sides 26 of the containers 120 are not connected or bridged with each other and allow a view into the inner space of the containers 120. However, at this point it is mentioned again that the container system according to the disclosure may also provide containers having closed top sides, if desired.

Exemplarily, the second container components 6 are equipped with an emergency exit opening 126 in each case, which exemplarily extends through the respective second top side 26. These may be arranged to be flush with emergency exit hatches which are arranged in a floor of a deck above it. The emergency exit openings 126 may also be arranged in the first top sides 10 or in a region therebetween, depending on the boundary conditions. Hence, FIG. 5 is only one of many possible examples.

Figure 7:
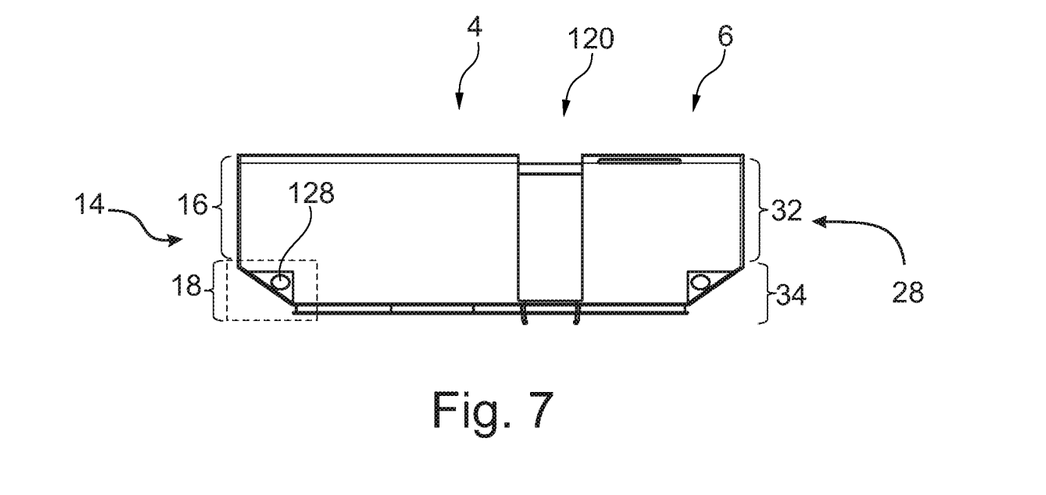
FIG. 7 shows a first connector for connecting a container with a supply line.
Figure 8:
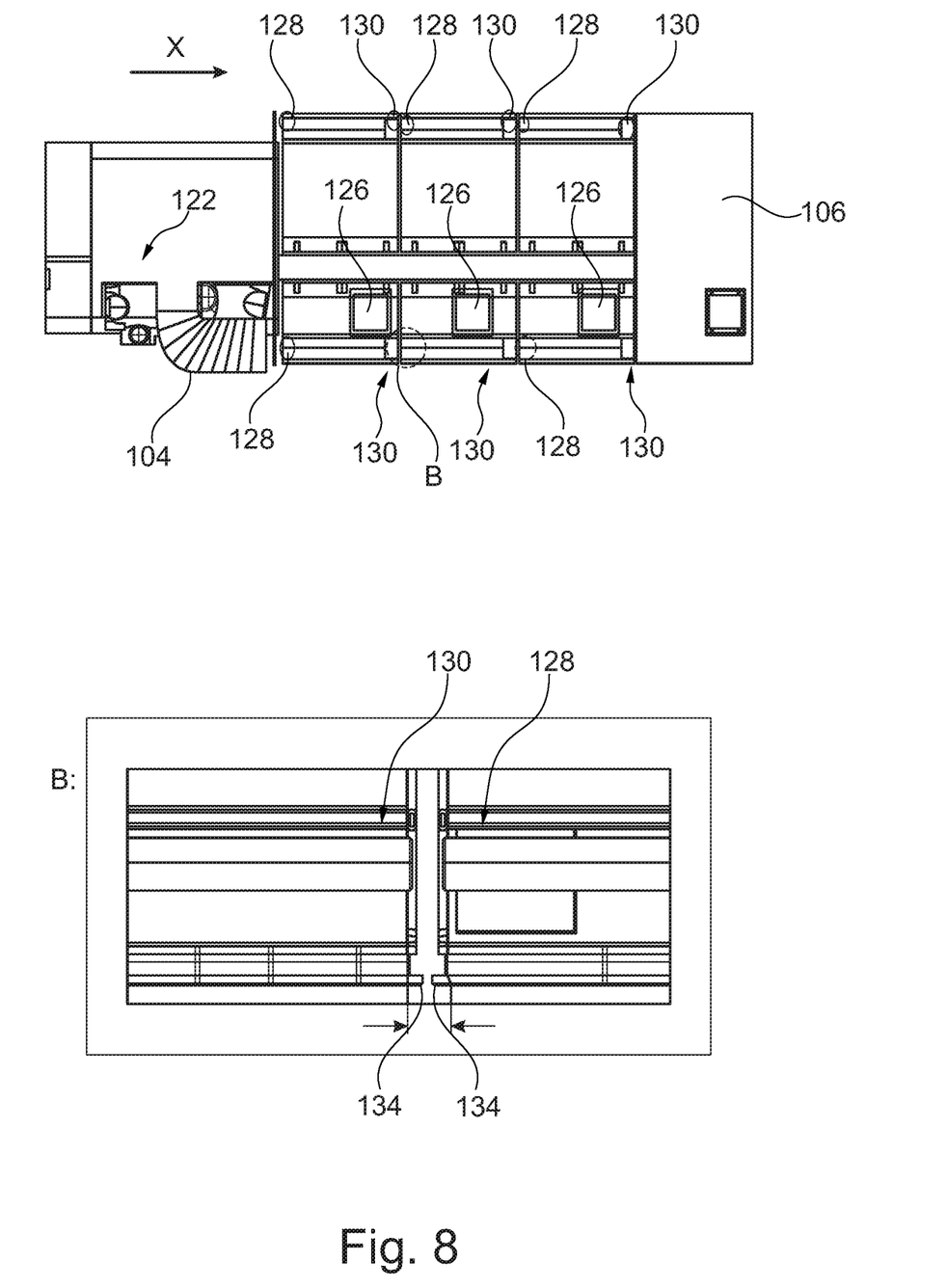
FIG. 8 shows a top view for connecting a container with a supply line.

Furthermore, FIG. 7 schematically shows a first connector 128 in a container 120 in form of an air connection. Exemplarily, the first connector 128 is arranged at the beveled region 18 of the first lateral surface and is connectable on the face side, i.e., in x direction. This may also be conducted at the second lateral surface 28 (as an alternative or additionally). FIG. 8 shows this in a top view. In order to reduce additional installation effort, the containers 120 may comprise a second connector 130 which is connectable with a first connector 128 of another container. Consequently, all containers 120 arranged one behind each other may create a daisy chain. Of course, this principle is applicable to all other kinds of supplies, i.e. electricity, data, signals and the like.

Figure 9:
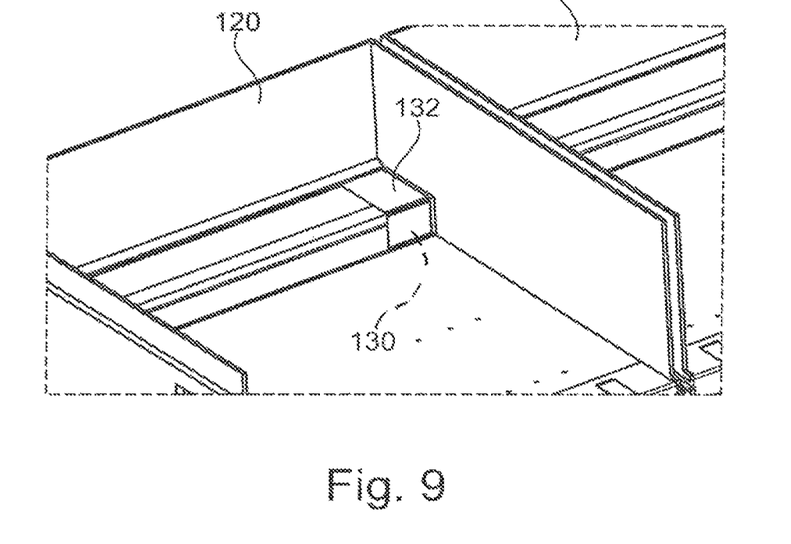
FIG. 9 shows a maintenance hatch for accessing first and second connectors of containers connected to each other.

Moreover, for operating the container components 4 and 6 individually, also the second container components 6 may be equipped with first connectors 128 and second connectors 130. A service hatch 132, which is exemplarily shown in FIG. 9, may be used for providing or removing connections between individual containers 120. First and/or second connectors 128, 130 may be amongst these.

Furthermore, FIG. 8 shows an arrangement of sealing elements 134 between two containers 120, which are pushed onto each other, in a detail view. These may circumferentially extend over the whole contour at the face side or merely around an opening region of an access to the respective container 12, e.g., in the region of an aisle. Each container 120 of each combination of containers should be sealed in a gas-tight manner to the surrounding space in the lower deck. In case of a fire extinguishing procedure to be conducted, for which, e.g., a gaseous fire extinguishing agent is used, the agent must not reach into the container 120 that accommodates persons.

Figure 10:
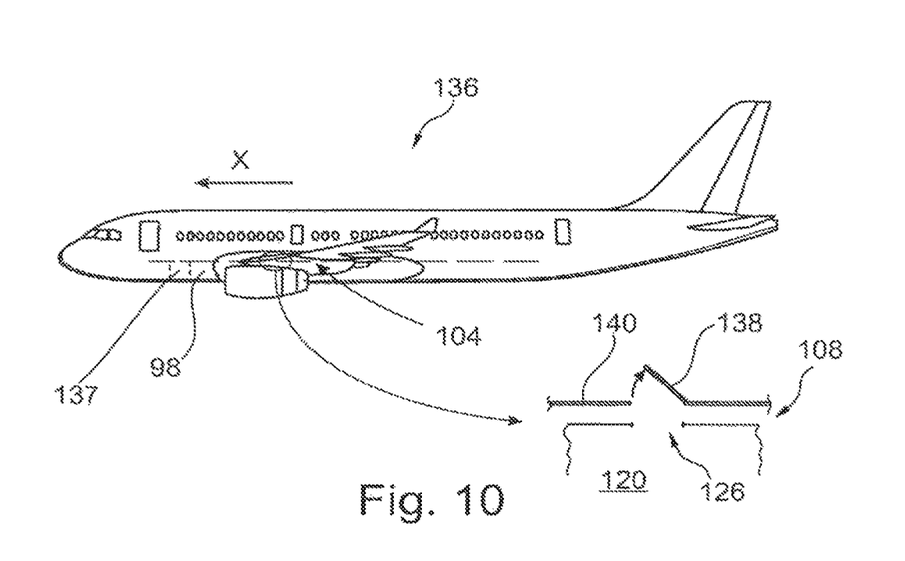
FIG. 10 shows an aircraft having a lower deck, which is equippable with containers, which are created through the container system according to the disclosure. A more complete understanding of the subject matter may be derived by referring to the detailed description and claims when considered in conjunction with the following figures, wherein like reference numbers refer to similar elements throughout the figures.

Finally, FIG. 10 shows an aircraft 136 in a lateral view, which is equipped with the lower deck 98, which in turn can be equipped with containers 120 according to the preceding description. Exemplarily, a forward cargo compartment 108 is shown in the lower deck 98. At one position of the drawing a detail with an emergency exit hatch 138 is shown, through which a user may climb from a container 120 through a floor 140 arranged above it. In this case, the emergency exit hatch is arranged as far away from the staircase 104 as possible, whose position is merely indicated. Exemplarily, the staircase 104 is positioned at an end of the cargo compartment distance from a cargo door 137.

Of course, this principle is also applicable to a rear cargo compartment (not shown) in the same way.

It is conceivable that multiple emergency exit hatches are arranged in the floor, which are placed in a center aisle or in a region in front of passenger seats of a business or first-class cabin. As mentioned previously, a sealing of all openings is required in order to prevent fire extinguishing agents from reaching into the container 120 and, in particular, also through the emergency exit hatch 138.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A multifunctional container system for producing a container utilizable in a cargo compartment of an aircraft, the system comprising:
   a first lateral container component, which constitutes a first lateral surface of the container that is at least partially beveled, a first resting surface having first fastening devices, and a first top side;
   a second lateral container component, which comprises a second lateral surface of the container that is at least partially beveled, a second resting surface having second fastening devices, and a second top side; and
   a floor cladding;
   wherein the floor cladding is configured to be selectively positioned between the first resting surface and the second resting surface, which enclose a continuous gap to each other and comprise a predetermined distance to each other and to create a protrusion that faces away from the first and second top side, which protrusion extends into a recess of a floor in a cargo compartment, at least in a region, and
   at least one removable spacer configured to hold the first lateral container component and the second lateral container component in the predetermined distance at least in a region, for an insertion into or removal out of a cargo compartment.

2. The container system according to claim 1, wherein the lower protrusion comprises a cross-section that is substantially rectangular or trapezoidal in the longitudinal direction of the container.

3. The container system according to claim 1, further comprising at least one first connector for connecting the container with at least one supply line, wherein the respective supplies are selected from a group of supplies, the group comprising:
   air;
   water;
   electricity; and
   data or signal sources and sinks.

4. The container system according to claim 3, further comprising at least one second connector to connect a container with a first connector of a further container, wherein the first connector and the second connector of a container are connected to each other.

5. The container system according to claim 1, wherein a container in a use position in a cargo compartment comprises an outer contour, which is equal to the outer contour of an underfloor container.

6. The container system according to claim 1, further comprising at least one elongate or circumferential, and gas tight, seal for sealing the inner space of a container, which is created through the container system, from the cargo compartment.

7. An aircraft, comprising:
   a cargo compartment having a guide element for introducing and holding containers; and
   at least one container created through a multifunctional container system according to claim 1.

8. The aircraft according to claim 7, wherein the guide element comprises a distance that is created transverse to a longitudinal direction of the cargo compartment, in which the lower protrusion of the at least one container is placeable and wherein the cargo compartment comprises an upper delimitation, to which an upper protrusion extends.

9. The container system according to claim 1, further comprising a ceiling cladding, wherein the ceiling cladding is configured to be positioned between the first top side and the second top side with the first and second lateral container components placed in a predetermined distance.

10. The container system according to claim 9, wherein the ceiling cladding provides an upper protrusion at least in a region, which upper protrusion faces away from the first resting surface and the second lower resting surface.

11. A multifunctional container system for producing a container utilizable in a cargo compartment of an aircraft, the system comprising:
   a first lateral container component, which constitutes a first lateral surface of the container that is at least partially beveled, a first resting surface having first fastening devices, and a first top side;

a second lateral container component, which comprises a second lateral surface of the container that is at least partially beveled, a second resting surface having second fastening devices, and a second top side; and
a floor cladding;
wherein the floor cladding is configured to be selectively positioned between the first resting surface and the second resting surface, which enclose a continuous gap to each other and comprise a predetermined distance to each other and to create a protrusion that faces away from the first and second top side, which protrusion extends into a recess of a floor in a cargo compartment, at least in a region, and
a ceiling cladding, wherein the ceiling cladding is configured to be positioned between the first top side and the second top side with the first and second lateral container components placed in a predetermined distance,
wherein the ceiling cladding at the first or the second container component is arranged to be stowable and selectively connectable with the respective other container component.

12. The container system according to claim 11, wherein the ceiling cladding provides an upper protrusion at least in a region, which upper protrusion faces away from the first resting surface and the second lower resting surface.

13. The container system according to claim 11, further comprising at least one elongate or circumferential, and gas tight, seal for sealing the inner space of a container, which is created through the container system, from the cargo compartment.

14. An aircraft, comprising:
a cargo compartment having a guide element for introducing and holding containers; and
at least one container created through a multifunctional container system according to claim 11.

15. A multifunctional container system for producing a container utilizable in a cargo compartment of an aircraft, the system comprising:
a first lateral container component, which constitutes a first lateral surface of the container that is at least partially beveled, a first resting surface having first fastening devices, and a first top side;
a second lateral container component, which comprises a second lateral surface of the container that is at least partially beveled, a second resting surface having second fastening devices, and a second top side; and
a floor cladding;
wherein the floor cladding is configured to be selectively positioned between the first resting surface and the second resting surface, which enclose a continuous gap to each other and comprise a predetermined distance to each other and to create a protrusion that faces away from the first and second top side, which protrusion extends into a recess of a floor in a cargo compartment, at least in a region, and
wherein the floor cladding comprises multiple plate-shaped elements, which are at least partially articulatedly connected to at least one of the first container component and the second container component.

16. The container system according to claim 15, wherein an elongate plate-shaped element is arranged at each of the first container component and the second container component, which plate-shaped element is bringable into a horizontal neutral position, in which the elongate plate-shaped element is arranged parallel to the respective resting surface, and into a use position, in which the elongate plate-shaped element is foldable downwardly into a position facing away from the respective top side.

17. The container system according to claim 16, wherein the elongate plate-shaped elements of the first container component and the second container component are lockable in the neutral position.

18. The container system according to claim 15, further comprising a ceiling cladding, wherein the ceiling cladding is configured to be positioned between the first top side and the second top side with the first and second lateral container components placed in a predetermined distance.

19. The container system according to claim 15, wherein the ceiling cladding provides an upper protrusion at least in a region, which upper protrusion faces away from the first resting surface and the second lower resting surface.

20. An aircraft, comprising:
a cargo compartment having a guide element for introducing and holding containers; and
at least one container created through a multifunctional container system according to claim 15.

* * * * *